United States Patent
Tjabringa

[19]

[11] Patent Number: 6,106,391

[45] Date of Patent: Aug. 22, 2000

[54] INCLINED CONVEYOR FOR AGRICULTURAL HARVESTING MACHINES

[75] Inventor: Heiko Tjabringa, Siddeburen, Netherlands

[73] Assignee: ARTEMIS Kautschuk-und Kunststofftechnik GmbH & Cie, Germany

[21] Appl. No.: 09/205,648

[22] Filed: Dec. 3, 1998

[30] Foreign Application Priority Data

Dec. 3, 1997 [DE] Germany ............................ 197 53 510

[51] Int. Cl.[7] .................................................. A01D 17/00
[52] U.S. Cl. ............................................ 460/144; 198/848
[58] Field of Search ...................................... 460/114, 144; 56/14.6, 14.5, 123, 124; 198/848, 690.2, 698, 699, 728

[56] References Cited

U.S. PATENT DOCUMENTS

| | | | |
|---|---|---|---|
| 336,126 | 2/1886 | Ludlum | 198/690.2 |
| 1,432,002 | 10/1922 | Wentz | 198/699 |
| 2,309,155 | 1/1943 | Anderson et al. | |
| 2,529,620 | 11/1950 | Marnach et al. | 460/144 |
| 3,096,875 | 7/1963 | Olson | 198/848 |
| 3,339,712 | 9/1967 | Anderson | 198/848 |
| 3,672,485 | 6/1972 | Walters | 198/26 |
| 4,712,668 | 12/1987 | Gray | 198/698 |
| 4,787,400 | 11/1988 | Tanis | 460/114 |
| 4,897,183 | 1/1990 | Lewis, Jr. et al. | 209/235 |
| 5,480,352 | 1/1996 | Luscombe | 460/114 |
| 5,941,768 | 8/1999 | Flamme | 460/114 |

FOREIGN PATENT DOCUMENTS

| | | |
|---|---|---|
| 33 09 281 A1 | 9/1984 | Germany . |
| 574777 | 4/1944 | United Kingdom . |

*Primary Examiner*—Thomas B. Will
*Assistant Examiner*—Arpad F Kovacs
*Attorney, Agent, or Firm*—Robert W. Becker & Associates

[57] ABSTRACT

An endless conveyor for conveying tuberous agricultural products has at least two parallel and spaced apart, pull-resistant, flexible belts circulating in the conveying direction of the conveyor and followers distributed over the entire length of the endless conveyor. The followers are arranged transversely to the conveying direction and project from the conveying plane of the endless conveyor. The followers have rigid rods with end portions connected to the belts. The followers have posts extending to essentially a projecting height of the followers. The followers have a flexible strip essentially extending between the at least two belts. The flexible strip consists of a web and has ends connected to the posts.

17 Claims, 1 Drawing Sheet

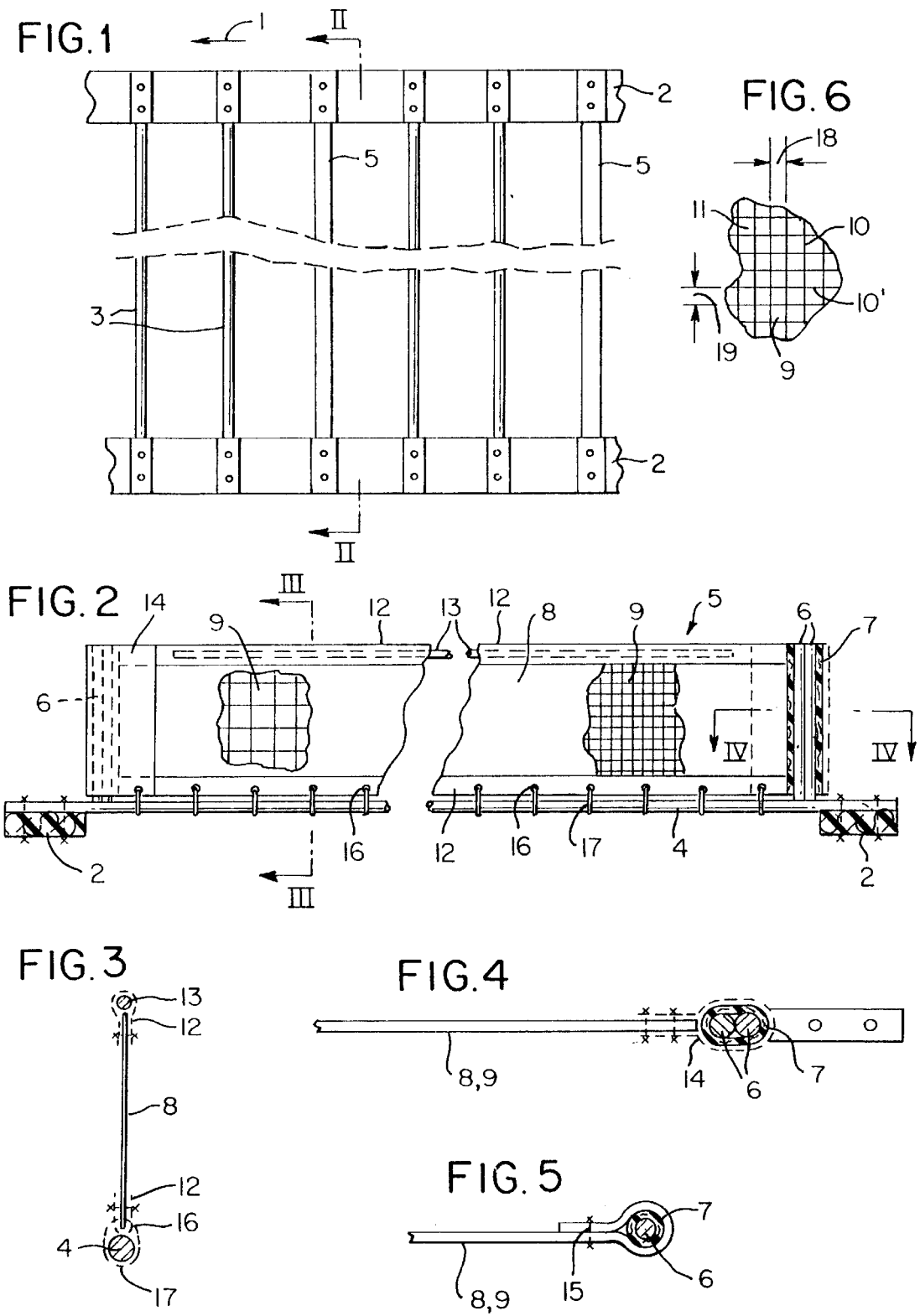

INCLINED CONVEYOR FOR AGRICULTURAL HARVESTING MACHINES

BACKGROUND OF THE INVENTION

The present invention relates to a circulating inclined conveyor for agricultural harvesting machines for tuberous agricultural products, especially potatoes. The inclined conveyor comprises two or more parallel, pull-resistant, flexible belts circulating in the conveying direction. Projecting followers extending transversely to the conveying direction are distributed over the entire length of the belts. The followers are provided with a rigid rod having end portions that are connected to the belts and are also provided in the area of the belts with posts extending to essentially the projecting height of the followers.

In known conveyors of this kind the posts which are arranged in the area of the belts are connected to one another by transverse rods made of steel. Apart from the fact that followers of that kind have a weight that is not insignificant, they can cause damage to the goods to be conveyed. It has further been suggested to manufacture the followers entirely of rubber or rubber-like materials. Although such followers treat the goods to be conveyed gently, they, too, have a relatively heavy weight.

It is an object of the invention to suggest followers for conveyors of the aforementioned kind which, on the one hand, treat the goods to be conveyed gently, and, on the other hand, have a relatively low weight.

SUMMARY OF THE INVENTION

As a solution to this object, that portion of the follower that has the primary acting function is designed as a flexible strip comprised of a web and is connected with its end portions to the posts. Expediently, the cord-shaped web elements are fixedly connected to one another at their crossing points. The active portion of the follower that receives the goods to be conveyed is non-rigid (yielding) in a certain sense because of its flexible, cord-shaped web elements; however, it is sufficiently rigid in order to convey, for example, potatoes. Moreover, the goods to be conveyed are being treated gently due to said web elements. Furthermore, the flexible strip has a low weight.

Preferably, the lower edge of the strip is attached to a rigid transverse rod which is connected by its ends to the conveyor belts and may, if necessary, support the two posts mentioned earlier. The upper edges of the strip can, in addition, be provided with inserts for reinforcing their edges.

BRIEF DESCRIPTION OF THE DRAWINGS

The object and advantages of the present invention will appear more clearly from the following specification in conjunction with the accompanying drawings, in which:

FIG. 1 shows a partial plan view of a continuous, circulating conveyor belt for an inclined conveyor of a potato harvesting machine;

FIG. 2 shows a view along line II—II of FIG. 1;

FIG. 3 shows a view along line III—III of FIG. 2;

FIG. 4 shows a view along line IV—IV of FIG. 2;

FIG. 5 shows a view corresponding to the one in FIG. 4, however, of a modified embodiment;

FIG. 6 shows a partial plan view of a web for a follower according to the invention.

DESCRIPTION OF PREFERRED EMBODIMENTS

The present invention will now be described in detail with the aid of several specific embodiments utilizing FIGS. 1 through 6.

The inclined conveyor circulating in the direction of arrow 1 is provided at both edges with pull-resistant belts 2 which are made of rubber-treated fabric and have a flat rectangular cross-section. They provide an attachment surface for transversely extending rigid (bending-resistant) rods 3 and 4, the end portions of which are fastened to the belts 2 by rivets or similar means. The rods 4 form portions of followers 5; the transverse rods 3 are arranged within the space between neighboring followers 5. The spacing of the rods is adjusted to the size of the goods to be conveyed. The belts 2 and the transverse rods 3 define a conveying plane.

In the area of the belts 2, perpendicularly extending posts 6 are attached to the rods 4 by welding. The posts can be provided in a double arrangement according to FIGS. 2 and 4, or in a single arrangement according to FIG. 5. In order to protect the goods to be conveyed, the posts 6 are covered by an elastically deformable tube 7. A strip 8 is connected to this post 6. The strip 8 consists essentially of a web 9 with cord-shaped web elements 10, 10' which are fixedly (shear-resistantly) connected to one another at their crossing points and which define approximately square mesh openings 11.

The strip 8 is provided at its upper and lower edges with an edge reinforcement 12 which is formed by a fabric strip arranged in a U-shape and attached by sewing (stitching) or the like. The upper edge reinforcement 12 can be designed to receive a reinforcement rod 13 as an edge reinforcement.

According to FIGS. 2 and 3, the ends of the strip 8 are attached by means of a flexible strip of plastic material 14, attached by sewing or the like, to the posts 6. The folded strip 14 receives the end portions of the web 9 between its ends and forms a loop surrounding the posts 6. In contrast, in the embodiment according to FIG. 5, the strip 8 or its web 9 is guided around the post 6 and is stitched (see reference numeral 15) at the doubled portion.

In order to be able to mount the individually manufactured strip 8, subsequent to the manufacture of the rod 4 that usually has the posts 6 welded thereto, the strip 8 with its correspondingly prepared end portions is being slid over the posts 6 and is subsequently connected with its lower edge to the rod 4. For this purpose, the lower edge reinforcement 12 is provided with metal eyes 16, namely, for receiving narrow bands, cords or the like (17) which are being looped around the rods 4.

As is shown in FIG. 2, webs 9 of various sizes can be used. However, the mesh width 18, 19 of the mesh openings of the web should preferably be 1–3 cm. They may, however, also be approximately 5 cm, for example, when beets are to be conveyed. As can be seen from the drawing, the web elements 10, 10' should extend at a right angle to one another and one web element 10 should extend in the longitudinal direction (the length) of the strip 8.

For a better securing on the belts 2, the rods 3, 4 are flattened at their ends; furthermore, the rods 4 or the posts 6 can be embodied with small lateral extensions in order to increase the tilt resistance of the followers.

According to the illustration in FIG. 1, two rods 3 are arranged between the followers 5. However, the number of these rods can also be selected to be different; moreover, the space between neighboring followers 5 can be bridged by a supporting net of the same kind as the web 9, and, if necessary, can be supported by one or more transverse rods 3 arranged between adjacent followers 5.

The specification incorporates by reference the disclosure of German priority document 197 53 510.0 of Dec. 3, 1997.

The present invention is, of course, in no way restricted to the specific disclosure of the specification and drawings, but also encompasses any modification within the scope of the appended claims.

What is claimed is:

1. An endless conveyor for conveying tuberous agricultural products, said conveyor comprising:

at least two parallel and spaced apart, pull-resistant, flexible belts (2) circulating in the conveying direction (1) of said conveyor;

followers (5) distributed over the entire length of said endless conveyor;

said followers (5) arranged transversely to said conveying direction (1) and projecting from a conveying plane of said endless conveyor;

said followers (5) having rigid rods (4);

said rigid rods (4) having end portions connected to said belts (2);

said followers (5) having posts (6) extending to essentially a projecting height of said followers (5);

said followers (5) comprising a flexible strip (8) essentially extending between said at least two belts (2);

said flexible strip (8) consisting of a web (9) and having ends connected to said posts (6).

2. A conveyor according to claim 1, wherein said web (9) comprises cord-shaped web elements (10, 10') which are fixedly connected to one another at crossing points.

3. A conveyor according to claim 2, wherein a first set of said cord-shaped web elements (10) extends in a longitudinal direction of said flexible strip (8) and a second set of said cord-shaped web elements (10') extends at a right angle thereto.

4. A conveyor according to claim 3, wherein said cord-shaped web elements (10, 10') form mesh openings having a mesh width of 1–5 cm.

5. A conveyor according to claim 3, wherein said mesh openings have a mesh width of 1–3 cm.

6. A conveyor according to claim 1, wherein said flexible strip (8) has an upper edge and a lower edge which are provided with edge reinforcements (12).

7. A conveyor according to claim 6, wherein said edge reinforcements (12) are comprised of fabric strips enclosing said edges of said web (9) and stitched thereto.

8. A conveyor according to claim 6, wherein said followers (5) further comprise cords (17) securing said lower edge of said flexible strip (8) to said rod (4), wherein said cords (17) penetrate said flexible strip (8) and are looped around said rod (4).

9. A conveyor according to claim 1, wherein said followers (5) further comprise plastic strips (14) connected to said ends of said flexible strip (8), wherein said plastic strips (14) enclose said ends of said flexible strip (8) and surround said posts (6).

10. A conveyor according to claim 1, wherein said ends of said flexible strip (8) are looped around said posts (6), doubled back onto said flexible strip (8) and attached to said flexible strip (8).

11. A conveyor according to claim 1, wherein said posts (6) comprise an elastically deformable tube (7).

12. A conveyor according to claim 1, wherein said flexible strip (8) essentially extends to the height of said posts (6).

13. A conveyor according to claim 1, wherein said followers (5) further comprise a reinforcement rod (13) positioned at said upper edge of said flexible strips (8) and extending over an entire length of said flexible strip (8) for stiffening said upper edge.

14. A conveyor according to claim 13, wherein said flexible strip (8) has an upper edge provided with an edge reinforcement (12), wherein said reinforcement rod (13) is inserted into said reinforcement (12) and is enclosed by said reinforcement (12).

15. A conveyor according to claim 1, wherein a space between adjacent ones of said followers (5) is bridged by a supporting net.

16. A conveyor according to claim 15, further comprising transverse rods (3) extending transversely to said conveying direction (1) and connected to said at least two belts (2), said transverse rods (3) positioned between adjacent ones of said followers (5), wherein said supporting net is supported by one or more of said transverse rods 3.

17. A conveyor according to claim 1, further comprising transverse rods (3) extending transversely to said conveying direction (1) and connected to said at least two belts (2), said transverse rods (3) positioned between adjacent ones of said followers (5).

* * * * *